(12) United States Patent
Murakami et al.

(10) Patent No.: US 10,836,053 B2
(45) Date of Patent: Nov. 17, 2020

(54) INDUSTRIAL ROBOT

(71) Applicant: Kobe Steel, Ltd., Kobe (JP)

(72) Inventors: Motoaki Murakami, Fujisawa (JP); Tatsuji Minato, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 16/347,030

(22) PCT Filed: Dec. 5, 2017

(86) PCT No.: PCT/JP2017/043562
§ 371 (c)(1),
(2) Date: May 2, 2019

(87) PCT Pub. No.: WO2018/105584
PCT Pub. Date: Jun. 14, 2018

(65) Prior Publication Data
US 2019/0275685 A1    Sep. 12, 2019

(30) Foreign Application Priority Data

Dec. 7, 2016 (JP) .................. 2016-237749

(51) Int. Cl.
*B25J 17/00* (2006.01)
*B25J 17/02* (2006.01)
(Continued)

(52) U.S. Cl.
CPC ............. *B25J 19/0029* (2013.01); *B25J 9/06* (2013.01); *B25J 17/00* (2013.01); *B25J 17/02* (2013.01); *B25J 18/00* (2013.01); *B25J 19/00* (2013.01)

(58) Field of Classification Search
CPC ..... B25J 19/0029; B25J 19/0025; B25J 19/06
See application file for complete search history.

(56) References Cited

U.S. PATENT DOCUMENTS 5,732,599 A * 3/1998 Iriyama ................ B25J 17/0241
74/490.02
5,881,604 A * 3/1999 Miwa ........................ B25J 5/02
74/490.03
(Continued)

FOREIGN PATENT DOCUMENTS

JP    60-48284 A    3/1985
JP    61-109680 A   5/1986
(Continued)

OTHER PUBLICATIONS

International Search Report dated Feb. 27, 2018 in PCT/JP2017/043562 filed Dec. 5, 2017.

*Primary Examiner* — Jake Cook
(74) *Attorney, Agent, or Firm* — Oblon, McClelland, Maier & Neustadt, L.L.P.

(57) ABSTRACT

An industrial robot includes a lower arm portion including: a pair of proximal-end-side support parts; a pair of distal-end-side support parts; and a housing which integrally supports the proximal-end-side support parts and the distal-end-side support parts. The housing houses a first drive motor, a second drive motor, a first power transmission mechanism, a second power transmission mechanism, and a cable bundle. In the housing, the first power transmission mechanism and the second power transmission mechanism are disposed on an axial end side of either a first joint shaft or a second joint shaft, and the cable bundle is disposed on an axial end side of the other joint shaft.

9 Claims, 14 Drawing Sheets

(51) Int. Cl.
  *B25J 18/00*   (2006.01)
  *B25J 19/00*   (2006.01)
  *B25J 9/06*    (2006.01)

(56) References Cited

U.S. PATENT DOCUMENTS

2014/0047940 A1   2/2014   Yamamoto
2014/0102240 A1   4/2014   Inada et al.
2016/0089778 A1   3/2016   Yokota et al.

FOREIGN PATENT DOCUMENTS

| JP | 11-123690 A  | 5/1999 |
| JP | 2001-113488 A | 4/2001 |
| JP | 2013-111716 A | 6/2013 |
| JP | 2014-37044 A | 2/2014 |
| JP | 2016-68204 A | 5/2016 |

\* cited by examiner

INDUSTRIAL ROBOT

TECHNICAL FIELD

The present invention relates to an industrial robot.

BACKGROUND ART

In recent years, industrial robots are actively utilized in manufacturing sites. Generally, for this type of industrial robots, a multi-joint robot having a joint structure which has six-axis freedom, etc. is frequently used. This multi-joint robot is formed by having a swinging portion provided on a base, a lower arm portion whose proximal end side part is rotatably coupled to the swinging portion, an upper arm portion coupled to a distal end side part of the lower arm portion, a wrist portion provided in the upper arm portion, etc. Since the multi-joint robot is used in a limited work space, downsizing of a main body of the robot is desired. For example, Patent Document 1 proposes that while placing cables so as not to prevent smooth work, the entire configuration of a wrist portion is downsized.

CITATION LIST

Patent Document

Patent Document 1: JP 2013-111716 A

SUMMARY OF THE INVENTION

Problem to be Solved by the Invention

In Patent Document 1, although downsizing of the upper arm portion is achieved, the lower arm portion is not mentioned. Further, when the constituent elements such as the lower arm portion and the upper arm portion are thinned, rigidity of the robot itself is lowered. Thus, there are sometimes a case where undesired vibration occurs during driving, and a case where highly precise positioning is not easily performed. There is also a case where by downsizing, a maintenance property for motors, power transmission mechanisms, etc. provided in the constituent elements of the robot is lowered. In particular, regarding the lower arm portion, rigidity to stably support the upper arm portion, the wrist portion, etc. is required. Thus, active downsizing is not easily performed in reality.

Therefore, an object of the present invention is to provide an industrial robot capable of being further downsized while ensuring rigidity and a maintenance property of the robot.

Means for Solving the Problem

An industrial robot of the present invention is formed by the following configuration.

The industrial robot includes
a swinging portion,
a lower arm portion whose proximal end side part is rotatably coupled to the swinging portion via a first joint shaft, and
an upper arm portion rotatably coupled to a distal end side part of the lower arm portion via a second joint shaft which is parallel to the first joint shaft, wherein
the lower arm portion has
a pair of proximal end side support portions disposed to be separated from each other, the proximal end side support portions forming the first joint shaft,
a pair of distal end side support portions disposed to be separated from each other, the distal end side support portions forming the second joint shaft, and
a housing that respectively integrally supports the proximal end side support portions and the distal end side support portions,
the housing accommodates
a first drive motor and a second drive motor disposed between the proximal end side support portions and the distal end side support portions,
a first power transmission mechanism that transmits rotation of the first drive motor to the first joint shaft,
a second power transmission mechanism that transmits rotation of the second drive motor to the second joint shaft, and
a cable bundle including at least cables connected to the first drive motor and the second drive motor, and
the first power transmission mechanism and the second power transmission mechanism are disposed on one of the shaft end sides of the first joint shaft and the second joint shaft, and the cable bundle is disposed on the other shaft end side.

With this industrial robot, the proximal end side support portions and the distal end side support portions serving as the first joint shaft and the second joint shaft of the lower arm portion are supported by the H-shaped housing having high rigidity. Therefore, the housing itself can be thinned, and weight of the lower arm portion can be reduced. In addition, the first power transmission mechanism and the second power transmission mechanism are disposed on the one of the shaft end sides of the joint shafts, and the cable bundle is disposed on the other shaft end side. Thereby, the power transmission mechanisms and the cable bundle are disposed in spaces different from each other in the housing. Thus, no contact between the members occurs, and it is possible to improve an assembling property and a maintenance property.

Preferably, the first power transmission mechanism has
a first drive pulley connected to an output shaft of the first drive motor,
a first driven pulley connected to the proximal end side support portion on the one of the shaft end sides, and
a first belt member looped over the first drive pulley and the first driven pulley,
the second power transmission mechanism has
a second drive pulley provided in an output shaft of the second drive motor,
a second driven pulley provided in the distal end side support portion on the one of the shaft end sides, and
a second belt member looped over the second drive pulley and the second driven pulley, and
the first power transmission mechanism and the second power transmission mechanism are disposed on the same plane.

With this industrial robot, the first power transmission mechanism and the second power transmission mechanism are disposed on the same plane. Thereby, it is possible to thin the lower arm portion regarding the direction of the joint shafts.

Preferably, the industrial robot further includes, in a side view seen from the axial direction of the first joint shaft and the second joint shaft of the housing, in a case where a line connecting the axis of the first joint shaft and the axis of the output shaft of the first drive motor serves as a first reference line, a line connecting the axis of the second joint shaft and the axis of the output shaft of the second drive motor serves as a second reference line, and a line connecting the axis of the first joint shaft and the axis of the second joint shaft serves as the central axis line,
   a first sliding mechanism that moves the first drive motor along the first reference line, and
   a second sliding mechanism that moves the second drive motor along the second reference line, wherein
   the first sliding mechanism and the second sliding mechanism are disposed in such a manner that at least one of the first reference line and the second reference line crosses the central axis line.

With this industrial robot, at least one of the first reference line and the second reference line crosses the central axis line. Thus, while ensuring a work space for adjusting tension of the belt members, it is possible to shorten longitudinal size of the housing. Thereby, it is possible to obtain a more compact industrial robot in which a lower arm portion is downsized.

Preferably, at least part of the housing in the side view has a recessed portion recessed toward the central axis line.

With this industrial robot, in a case where the lower arm portion or the upper arm portion is folded, it is possible to avoid contact with peripheral members. Thus, it is possible to extend a movable range of the robot.

Preferably, the curvature radius of the recessed portion is 50 to 250 mm.

With this industrial robot, by setting the curvature radius of the recessed portion to the above range, it is possible to form a dent for avoiding the contact with the peripheral members by required size within a minimum range.

Preferably, a separation distance between the first joint shaft and the second joint shaft is 300 to 400 mm.

With this industrial robot, it is possible to shorten an inter-axis distance between the joints to the above range, and contribute to downsizing of the robot.

Preferably, the cables include at least driving cables of the first drive motor and the second drive motor.

With this industrial robot, the driving cables of the first drive motor and the second drive motor are disposed on the one of the shaft end sides in the housing. Thereby, disposition and maintenance of the cables are more easily performed.

Preferably, a multi-axis robot having at least six-axis freedom is used.

With this industrial robot, the rigidity is high, the maintenance property is ensured, and downsizing is achieved.

Effects of the Invention

According to the present invention, it is possible to further downsize the industrial robot while ensuring the rigidity and the maintenance property of the robot.

DESCRIPTION OF EMBODIMENTS

Hereinafter, an embodiment of the present invention will be described in detail with reference to the drawings. In the present embodiment, a multi-joint robot having six-axis freedom will be described as an example. However, the present invention is not limited to this.

Entire Configuration of Industrial Robot

Figure 1:
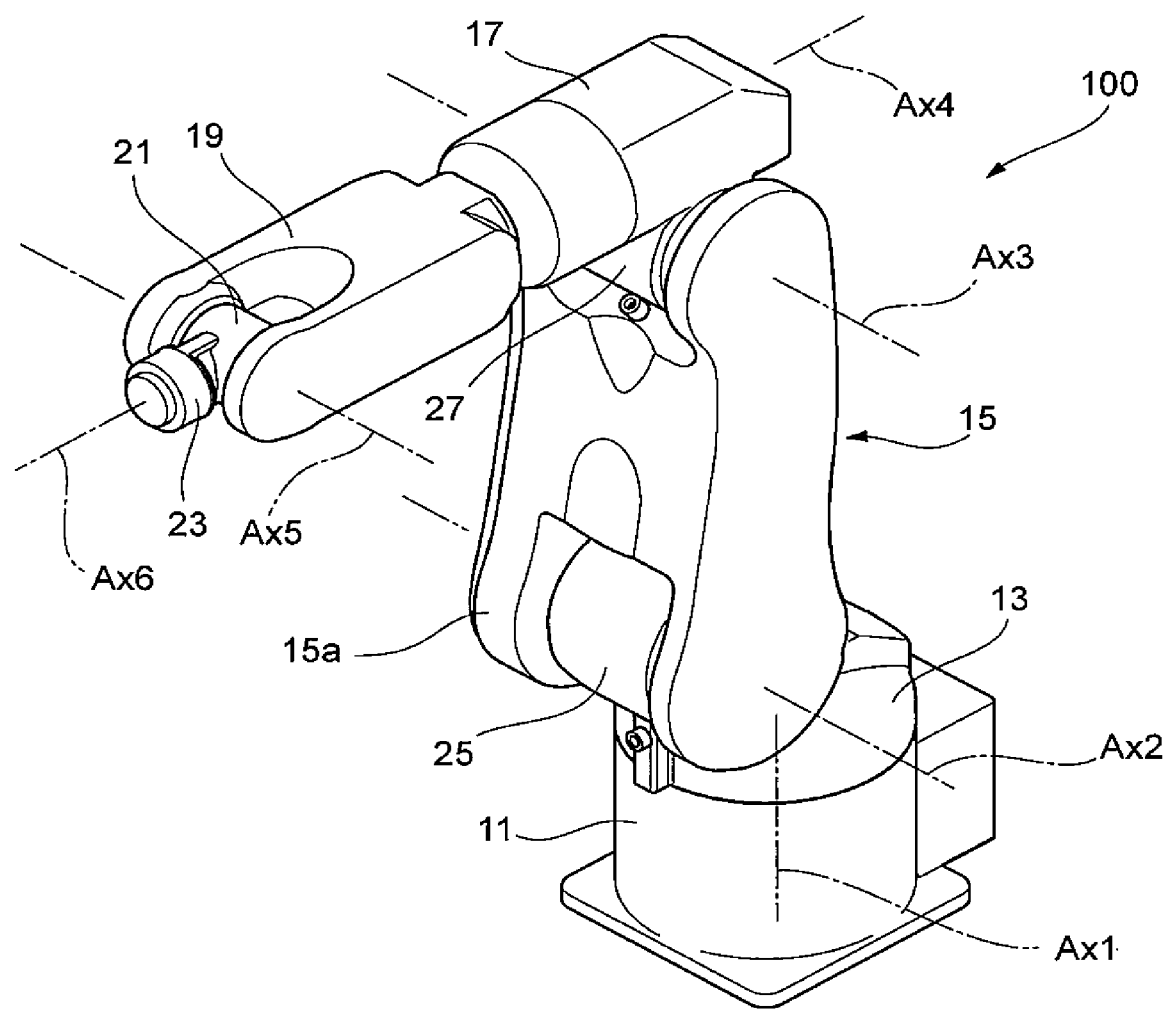
FIG. 1 is a perspective view showing an outer appearance of an industrial robot of the present invention.
Figure 2:
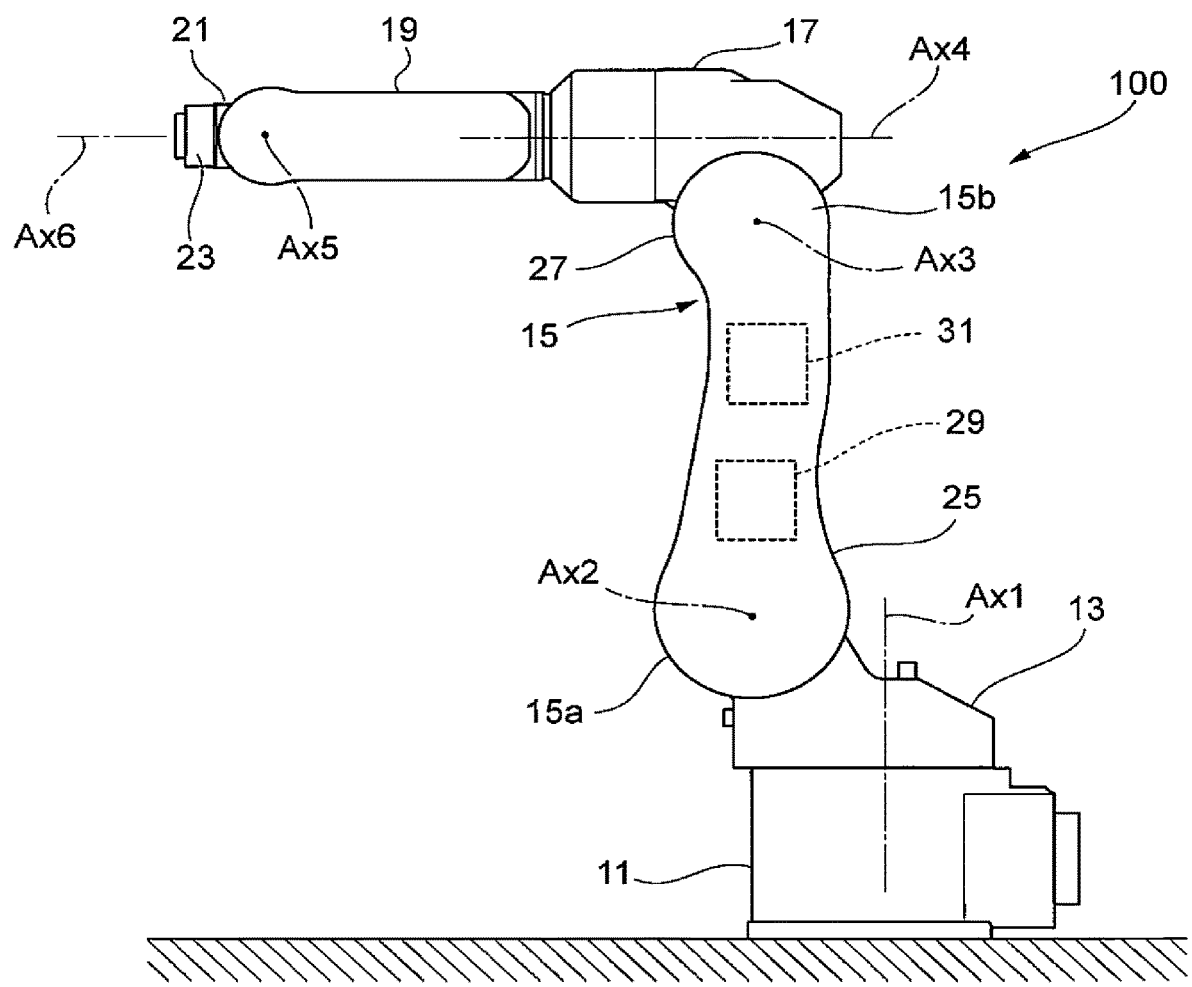
FIG. 2 is a side view of the industrial robot shown in FIG. 1.

FIG. 1 is a perspective view showing an outer appearance of an industrial robot, and FIG. 2 is a side view of the industrial robot shown in FIG. 1.

The industrial robot 100 is a multi-axis robot including a base 11, a swinging portion 13, a lower arm portion 15, an upper arm portion 17, a wrist swinging portion 19, a wrist bending portion 21, and a wrist rotating portion 23, the robot having a general six-axis freedom structure.

The swinging portion 13 can swing on the first rotation axis line Ax1 on the base 11. A proximal end side part 15a of the lower arm portion 15 is rotatably coupled to the swinging portion 13 via a first joint shaft 25 on the second rotation axis line Ax2. The upper arm portion 17 is rotatably coupled to a distal end side part 15b of the lower arm portion 15 via a second joint shaft 27 on the third rotation axis line Ax3. The second rotation axis line Ax2 and the third rotation axis line Ax3 are parallel to each other.

Although detailed description will not be given, the wrist swinging portion 19 is coupled to the upper arm portion 17 swingably on the rotation axis line Ax4. The wrist bending portion 21 is supported by the wrist swinging portion 19 rotatably on the rotation axis line Ax5, and the wrist rotating portion 23 is supported by the wrist bending portion 21 rotatably on the rotation axis line Ax6.

The base 11 has a motor (not shown) inside, and lets the swinging portion 13 swing on the first rotation axis line Ax1 by drive of the motor. As shown in FIG. 2, a first drive motor 29 that drives and rotates the lower arm portion 15 on the second rotation axis line Ax1, and a second drive motor 31 that drives and rotates the upper arm portion 17 on the third rotation axis line Ax3 are built in the lower arm portion 15.

Figure 3:
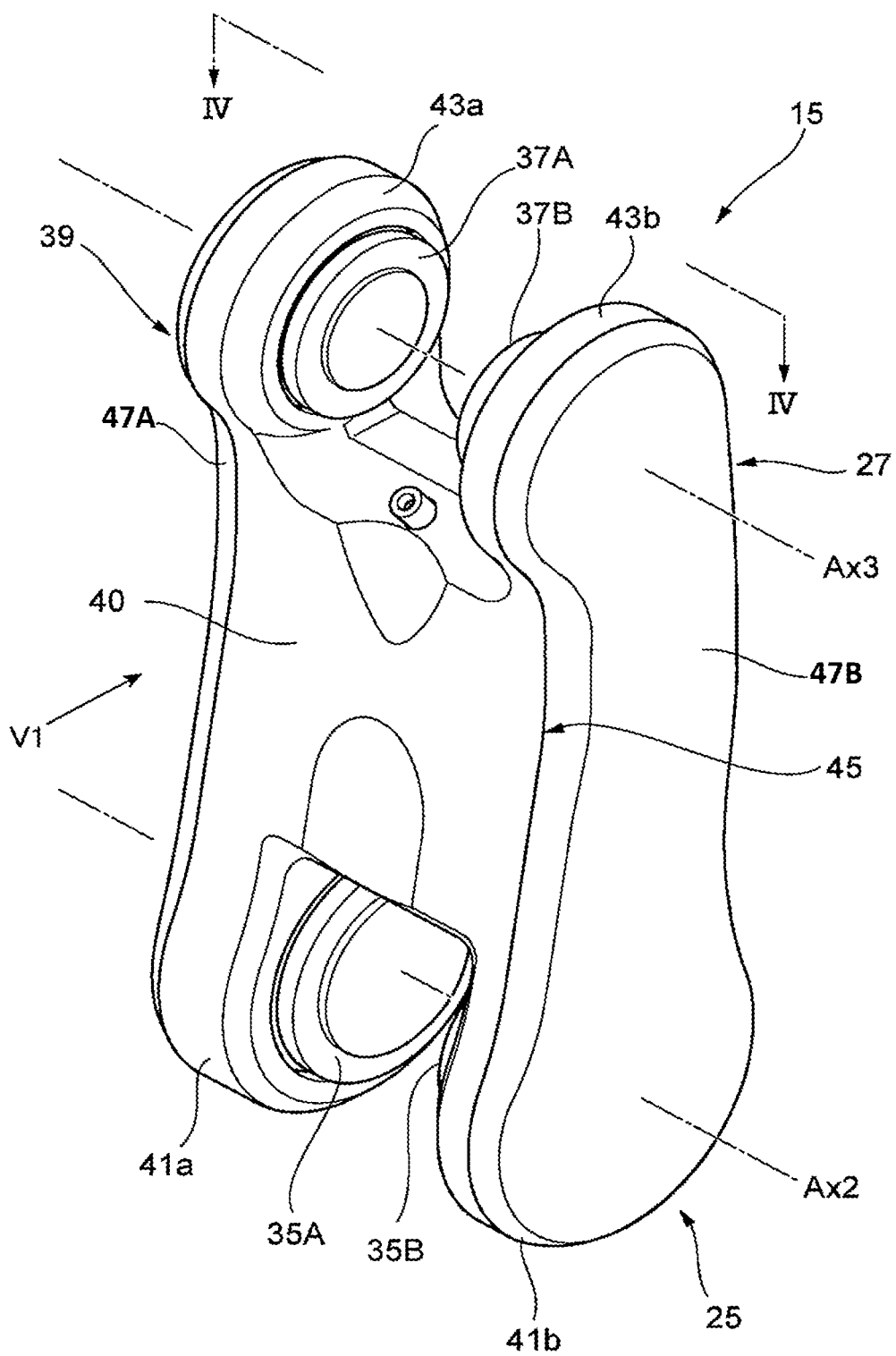
FIG. 3 is a perspective view of a lower arm portion.

FIG. 3 is a perspective view of the lower arm portion 15.

The lower arm portion 15 has a pair of proximal end side support portions 35A, 35B, a pair of distal end side support portions 37A, 37B, and a housing 39 that respectively integrally supports the proximal end side support portions 35A, 35B and the distal end side support portions 37A, 37B. The proximal end side support portions 35A and 35B are fixed to the housing 39 while being separated from each other in the axial direction, and a joint portion of the swinging portion 13 is coupled between both the proximal end side support portions. Similarly, the distal end side support portions 37A and 37B are also disposed in the housing 39 while being separated from each other in the axial direction, and a joint portion of the upper arm portion 17 is coupled between both the distal end side support portions.

The housing 39 has an H shape in a front view seen from the V1 direction of FIG. 3. The housing 39 has a housing main body 45, and a pair of cover members 47A, 47B. The pair of cover members 47A, 47B is respectively detachably attached to axial end portions of the first joint shaft 25 and the second joint shaft 27 of the housing main body 45.

The housing main body 45 has a main body portion 40 on the center in the longitudinal direction of the housing 39 (in the up and down direction of FIG. 3), a pair of proximal end side end portions 41a, 41b projecting from the longitudinal proximal end side of the main body portion 40, and a pair of distal end side end portions 43a, 43b projecting from the longitudinal distal end side of the main body portion 40.

The proximal end side support portion 35A is fixed to this proximal end side end portion 41a, and the proximal end side support portion 35B is fixed to the proximal end side end portion 41b. Similarly, the distal end side support portion 37A is fixed to the distal end side end portion 43a, and the distal end side support portion 37b is fixed to the distal end side end portion 43b. With the above configuration, the proximal end side support portions 35A, 35B and the distal end side support portions 37A, 37B are integrally supported by the H-shaped housing main body 45. In the housing main body 45, in comparison to a case where each of the joint shafts is supported by one support portion, the joint shaft is supported by sharing a load by the pair of support portions. Thus, it is possible to make thickness of the support portions thinner. In that case, by reducing weight of the lower arm portion 15, inertia weight is suppressed to be small, so that vibration, etc. does not easily occur and high positioning precision can be ensured.

Disposition of Power Transmission Member and Cable Bundle in Housing

Figure 4:
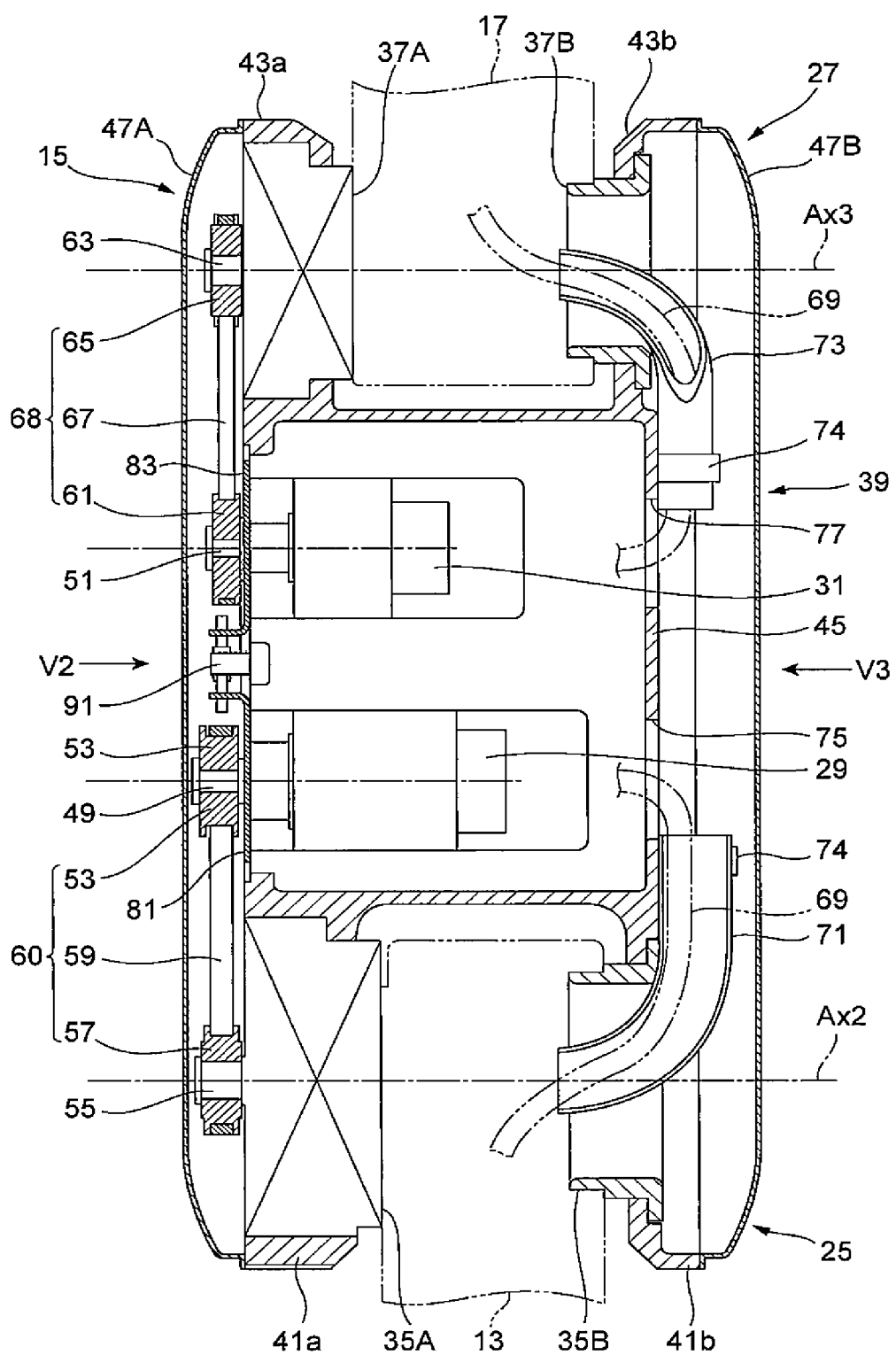
FIG. 4 is a sectional view taken along the line IV-IV of the lower arm portion shown in FIG. 3.
Figure 5:
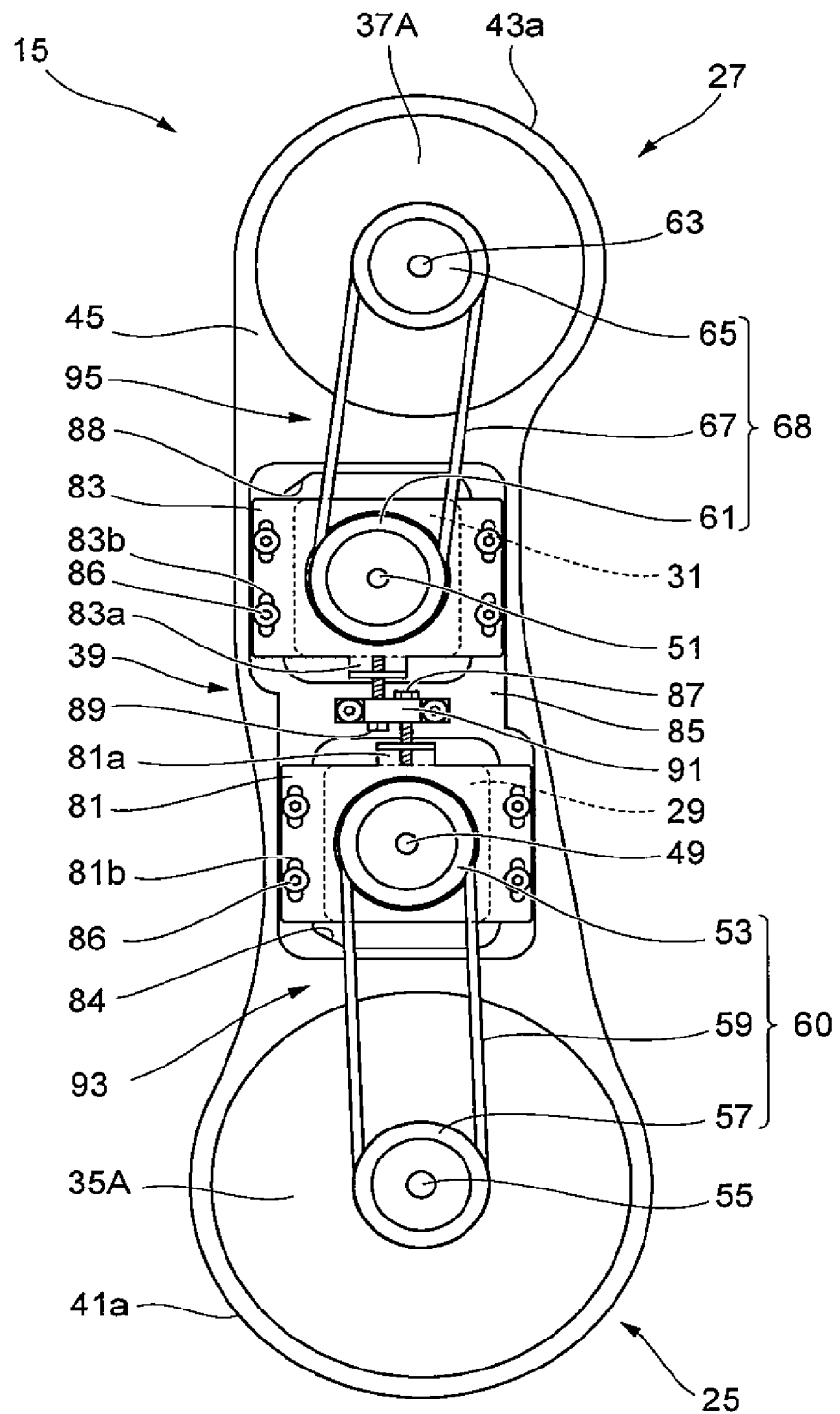
FIG. 5 is a side view seen from the V2 direction of a housing in a state where a cover member shown in FIG. 4 is removed.
Figure 6:
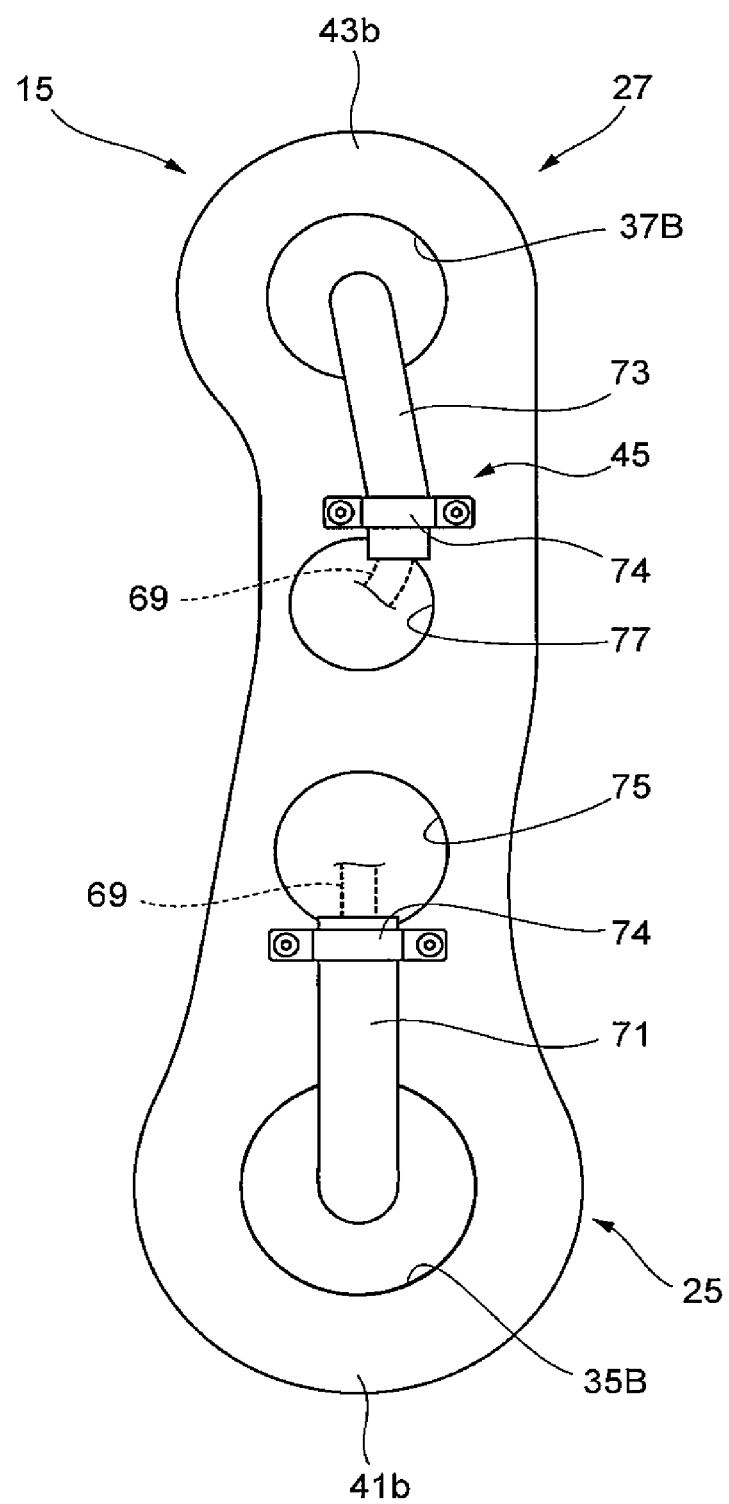
FIG. 6 is a side view seen from the V3 direction of the housing in a state where the cover member shown in FIG. 4 is removed.

FIG. 4 is a sectional view taken along the line IV-IV of the lower arm portion 15 shown in FIG. 3. FIG. 5 is a side view seen from the V2 direction of the housing 39 in a state where the cover member 47A shown in FIG. 4 is removed. FIG. 6 is a side view seen from the V3 direction of the housing 39 in a state where the cover member 47B shown in FIG. 4 is removed.

As shown in FIG. 4, inside the housing main body 45 between the proximal end side support portions 35A, 3533 and the distal end side support portions 37A, 37B, the first drive motor 29 and the second drive motor 31 described above are disposed so that motor output shafts 49, 51 of the drive motors are parallel to each other.

As shown in FIGS. 4 and 5, a first drive pulley 53 is provided in the motor output shaft 49 of the first drive motor 29. The proximal end side support portion 35A in the proximal end side end portion 41a is formed by a reducer having a high speed shaft 55 on the one end side. A first driven pulley 57 is provided in the high speed shaft 55 of the reducer. A first belt member 59 is looped over the first drive pulley 53 and the first driven pulley 57. The first drive pulley 53, the first driven pulley 57, and the first belt member 59 described above form a first power transmission mechanism 60 that transmits rotation of the first drive motor 29 to the first joint shaft.

A second drive pulley 61 is provided in the motor output shaft 51 of the second drive motor 31. The distal end side support portion 37A in the distal end side end portion 43a is formed by a reducer having a high speed shaft 63 on the one end side. A second driven pulley 65 is provided in the high speed shaft 63 of the reducer. A second belt member 67 is looped over the second drive pulley 61 and the second driven pulley 65. The second drive pulley 61, the second driven pulley 65, and the second belt member 67 described above form a second power transmission mechanism 68 that transmits rotation of the second drive motor 31 to the second joint shaft 27.

The first power transmission mechanism 60 and the second power transmission mechanism 68 are disposed on the same plane on the axially one end side of the second rotation axis line Ax2 and the third rotation axis line Ax3 in the housing 39. Thereby, it is possible to dispose the mechanisms with high space efficiency, and thin the housing 39 regarding the axial direction of the joint shafts.

Meanwhile, as shown in FIGS. 4 and 6, cable bundles 69 including various signal cables such as power cables and driving cables connected to the first drive motor 29 and the second drive motor 31 are respectively disposed on the axially other end side of the second rotation axis line Ax2 and the third rotation axis line Ax3 in the housing 39. Tubular guide members 71, 73 are fixed onto a side surface of the housing main body 45 on the axially other end side by fixing tools 74. The cable bundles 69 extended from the inside of the housing main body 45 through opening holes 75, 77 are inserted through the guide members 71, 73 and guided to the first joint shaft 25 and the second joint shaft 27. Other cables, etc. provided between the first joint shaft 25 and the second joint shaft 27 may be inserted through the guide members 71, 73.

The inner diameter of these guide members of the cables is preferably 18 to 26 mm. When the inner diameter is 18 mm or more, it is possible to ensure a protection space against bending of the cables at the time of actions of the joint shafts. When the inner diameter is 26 mm or less, it is possible to prevent the curvature radius of the cables and the guide members from increasing more than necessary.

With the configuration of the lower arm portion 15 described above, the first power transmission mechanism 60 and the second power transmission mechanism 68 are disposed on any one of the shaft end sides of the first joint shaft 25 and the second joint shaft 27 in the housing 39. The cable bundles 69 guided by the guide members 71, 73 are disposed on the other shaft end side.

Thereby, the housing 39 accommodates the members for power transmission and the members for cable wiring separately in spaces different from each other in the housing 39. Therefore, it is possible to prevent contact between the cables and the members for power transmission at the time of drive of the robot, and damage to the cables. In comparison to a case where both the members are mixed and disposed on the same side, it is possible to improve an assembling property and a maintenance property of the lower arm portion 15.

Tension Adjustment Mechanism

Next, tension adjustment mechanisms of the first belt member 59 and the second belt member 67 will be described.

Figure 7:
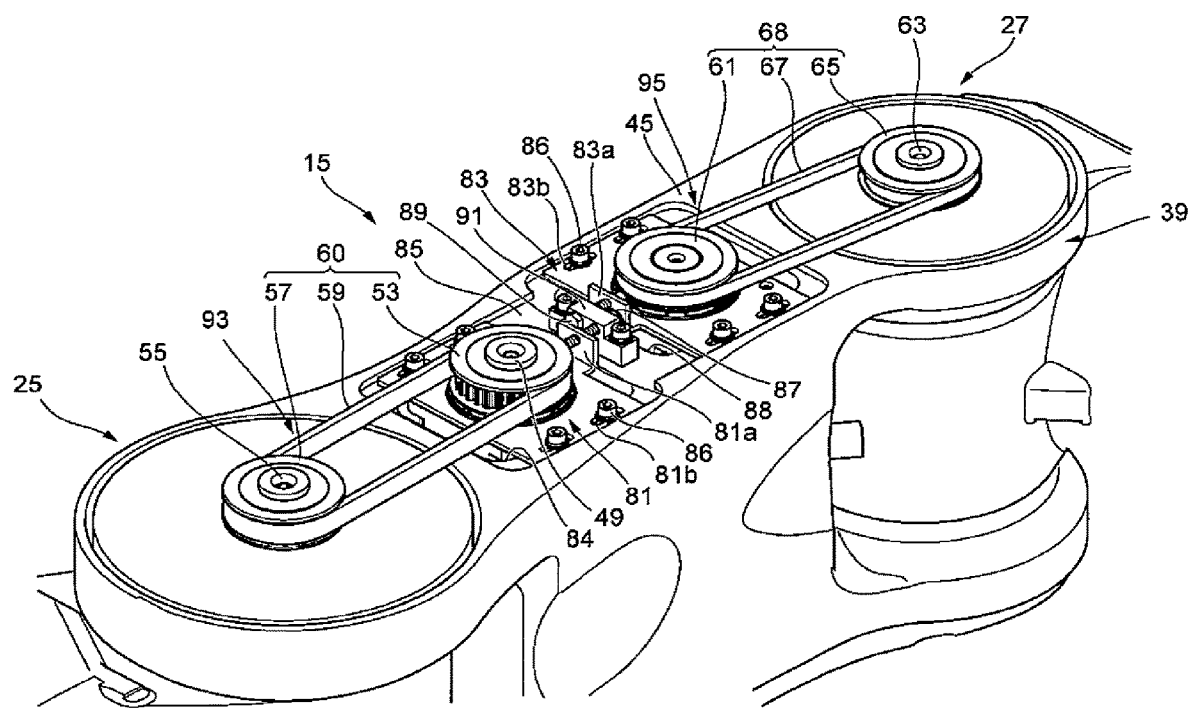
FIG. 7 is a perspective view showing a configuration of tension adjustment mechanisms.

FIG. 7 is a perspective view showing a configuration of the tension adjustment mechanisms.

As shown in FIGS. 5 and 7, the first power transmission mechanism 60 has a first tension adjustment mechanism (first sliding mechanism) 93 that changes tension of the first belt member 59 by bringing the motor output shaft 49 close to or away from the high speed shaft 55 of the first joint shaft 25. The second power transmission mechanism 68 similarly has a second tension adjustment mechanism (second sliding mechanism) 95 that changes tension of the second belt member 67 by bringing the motor output shaft 51 close to or away from the high speed shaft 63 of the second joint shaft 27.

Hereinafter, details of the tension adjustment mechanisms will be described.

The first drive motor 29 is fixed to a first motor support plate 81. The first motor support plate 81 is a substantially-rectangular plate-shaped member having a locking portion 81a in a part thereof. Plural long holes 83b extending along the longitudinal direction of the housing 39 are formed in this first motor support plate 81. The second drive motor 31 is fixed to a second motor support plate 83. The second motor support plate 83 is also a substantially-rectangular plate-shaped member having a locking portion 83a in a part thereof. Plural long holes 83b extending along the longitudinal direction of the housing 39 are also formed in this second motor support plate 83.

The first motor support plate 81 and the second motor support plate 83 are mounted on a flat-surface-shaped sliding support portion 85 formed in a side surface portion of the housing main body 45. The sliding support portion 85 is formed by recessing the side surface portion of the housing main body 45 while having a level difference portion. Two openings 84, 88 through which the shafts of the first drive motor and the second drive motor are inserted are formed in the sliding support portion 85. In outer peripheral edge portions of the openings 84, 88 of the sliding support portion 85, internal thread holes (not shown) to be screwed onto fastening bolts 86 are formed in parts opposing the long holes 81b of the first motor support plate 81 and the long holes 83b of the second motor support plate 83. In the example of the figures, the four long holes 81b of the first motor support plate 81 and the four long holes 83b of the second motor support plate 83 are provided. However, the present invention is not limited to this.

Between the first motor support plate 81 and the second motor support plate 83 of the sliding support portion 85, a fixing block 91 that supports tension adjusting bolts 87, 89 stands integrally with the housing main body 45. In the fixing block 91, a pair of bolt insertion holes (not shown) is formed along the longitudinal direction of the housing 39. The tension adjusting bolt 87 is inserted through one of the bolt insertion holes from the side opposing the second motor support plate 83. The tension adjusting bolt 89 is inserted through the other bolt insertion hole from the side opposing the first motor support plate 81.

A shaft portion distal end side part of the tension adjusting bolt 87 is screwed into an internal thread hole (not shown) formed in the locking portion 81a of the first motor support plate 81. A shaft portion distal end side part of the tension adjusting bolt 89 is screwed into an internal thread hole (not shown) formed in the locking portion 83a of the second motor support plate 83.

The locking portions 81a, 83a of this configuration are projections formed by folding part of the first motor support plate 81 and part of the second motor support plate 83 from plate surfaces respectively at a right angle. However, as long as the tension adjusting bolts 87, 89 can be screwed to the locking portions, the present invention is not limited to this configuration.

With the tension adjustment mechanisms of the above configuration, by rotating and adjusting the tension adjusting bolts 87, 89 attached to the fixing block 91, the first motor support plate 81 and the second motor support plate 83 are displaced along the longitudinal direction of the housing 39. Thereby, it is possible to adjust the tension of the first belt member 59 and the second belt member 67.

By fixing the first motor support plate 81 and the second motor support plate 83 to the housing main body 45 by the fastening bolts 86 after adjustment of the tension, the adjusted tension is maintained. In this case, it is possible to adjust the tension on the first drive motor 29 side and the second drive motor 31 side by using the single fixing block 91. In comparison to a case where fixing blocks are individually disposed on the respective sides to adjust, the adjustment mechanisms become simpler and an adjustment work does not become complicated.

With the tension adjustment mechanisms of the above configuration, the tension adjusting directions by tension adjustment of the first drive motor 29 and the second drive motor 31 can be in a relationship to cross each other. Thereby, the tension adjusting bolts 87, 89 that perform tension adjustment are not disposed on the same axis and long shaft length is not required. Therefore, while ensuring a disposition space of the fixing block 91 and a work space in which a tool, etc. is inserted, it is possible to shorten an inter-axis distance between the first joint shaft 25 and the second joint shaft 27 more. As a result, it is possible to downsize the lower arm portion 15.

The inter-axis distance between the first joint shaft 25 and the second joint shaft 27 of the lower arm portion 15, that is, an inter-axis distance (separation distance) between the second rotation axis line Ax2 and the third rotation axis line Ax3 shown in FIG. 4 is preferably 300 to 400 mm. When the inter-axis distance is 300 mm or more, a movable range of the robot is not narrowed down more than necessary. When the inter-axis distance is 400 mm or less, within a limited work space, it is possible to position the robot in a targeted posture without contact between a robot arm and peripheries.

Figure 8:
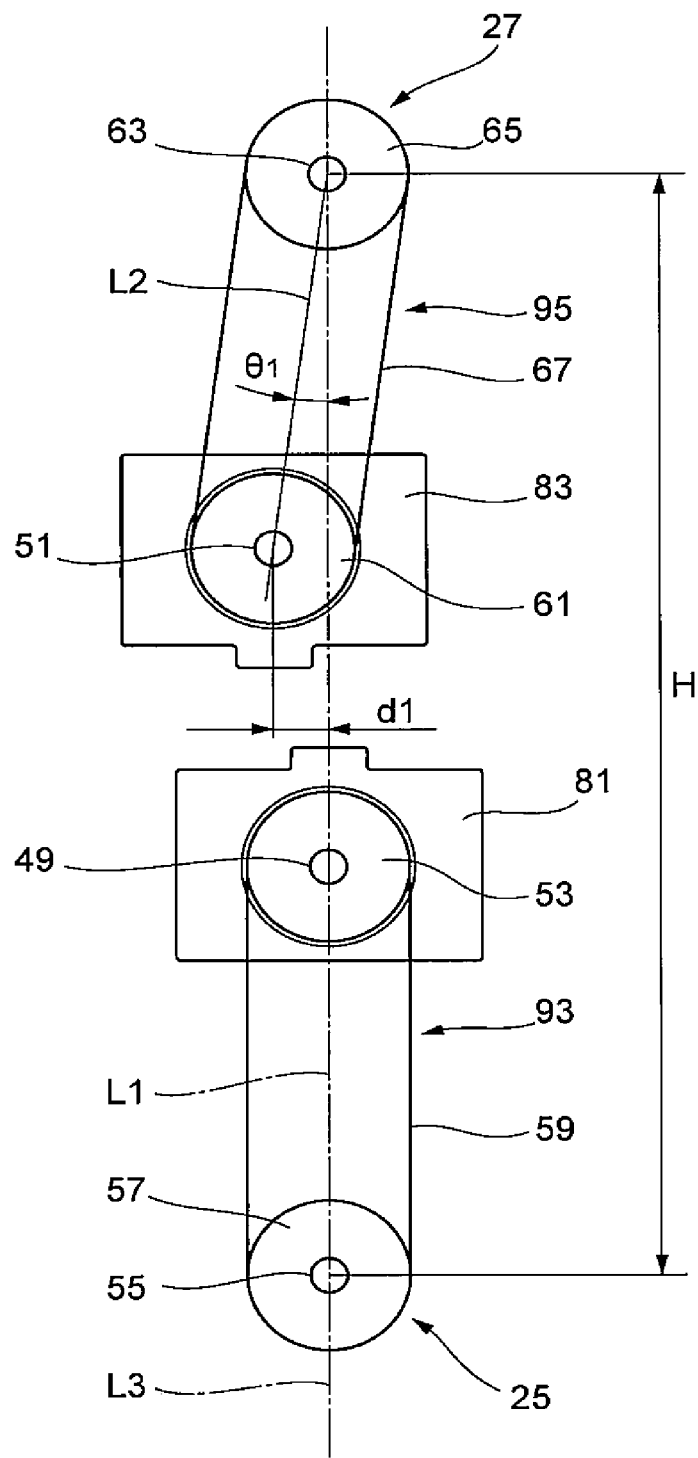
FIG. 8 is an illustrative view schematically showing the tension adjusting directions of the tension adjustment mechanisms.

FIG. 8 is an illustrative view schematically showing the tension adjusting directions of the tension adjustment mechanisms.

FIG. 8 shows a disposition mode of the tension adjustment mechanisms shown in FIG. 5. In a side view seen form the axially one end side of the first joint shaft 25 and the second joint shaft 27, a line connecting the axis of the high speed shaft 55 serving as the first joint shaft 25 and the axis of the motor output shaft 49 of the first drive motor serves as a first reference line $L_1$. A line connecting the axis of the high speed shaft 63 serving as the second joint shaft 27 and the axis of the motor output shaft 51 of the second drive motor serves as a second reference line $L_2$. A line connecting the axis of the high speed shaft 55 and the axis of the high speed shaft 63 serves as the central axis line $L_3$. That is, the first tension adjustment mechanism 93 moves the first drive motor along the first reference line $L_1$, and the second tension adjustment mechanism 95 moves the second drive motor along the second reference line $L_2$.

In this case, the second tension adjustment mechanism 95 is disposed in such a manner that the second reference line $L_2$ crosses the central axis line $L_3$ by an angle $\theta_1$. Thus, the motor output shaft 49 of the first tension adjustment mechanism 93 and the motor output shaft 51 of the second tension adjustment mechanism 95 are disposed to be displaced from each other by a distance $d_1$ in the direction orthogonal to the central axis line $L_3$. Since this displacement of the distance $d_1$ exists, the axis directions of the pair of tension adjusting bolts 87, 89 described above can be offset from each other and disposed. Therefore, the tension adjusting bolts 87, 89 are not brought into contact with each other but can be disposed so that the first drive motor 29 and the second drive motor 31 are close to each other while ensuring a disposition space of the fixing block 91 and a work space. Thereby, it is possible to more shorten an inter-axis distance H between the first joint shaft 25 and the second joint shaft 27.

Figure 9A:
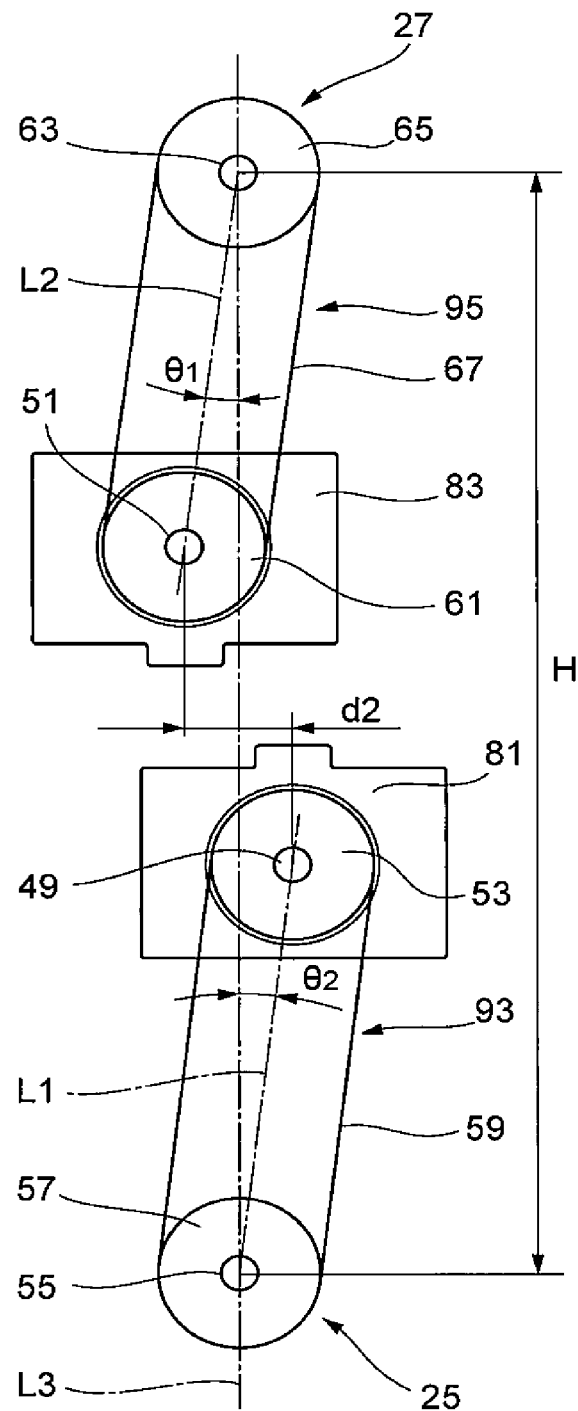
FIG. 9A is a schematic illustrative view of the tension adjustment mechanisms set in the tension adjusting directions which are different from the case shown in FIG. 8.
Figure 9B:
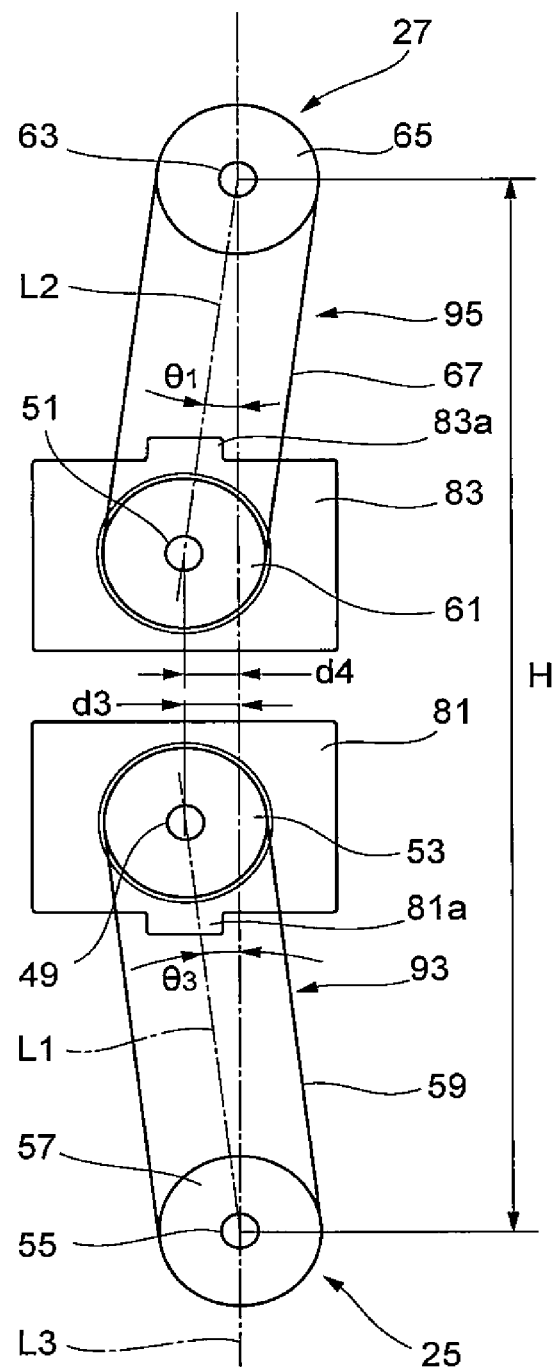
FIG. 9B is a schematic illustrative view of the tension adjustment mechanisms set in the tension adjusting directions which are different from the case shown in FIG. 8.

FIGS. 9A and 9B are schematic illustrative views of the tension adjustment mechanisms set in the tension adjusting directions which are different from the case shown in FIG. 8.

In a disposition example of the tension adjustment mechanisms shown in FIG. 9A, in addition to the crossing of the second reference line $L_2$ of the second tension adjustment mechanism 95 shown in FIG. 8 and the central axis line $L_3$ by the angle $\theta_1$, the first reference line $L_1$ of the first tension adjustment mechanism 93 crosses the central axis line $L_3$ by an angle $\theta_2$ in the opposite direction to the angle $\theta_1$. In a case of this disposition mode, displacement of the motor output shafts 49, 51 in the direction orthogonal to the central axis line $L_3$ is a distance $d_2$ which is larger than the distance $d_1$. In this case, it is possible to ensure a larger work space for tension adjustment, and more shorten the inter-axis distance H between the first joint shaft 25 and the second joint shaft 27.

In a disposition example of the tension adjustment mechanisms shown in FIG. 9B, the tilting direction of the first reference line $L_1$ of the first tension adjustment mechanism 93 is opposite to the case shown in FIG. 9A, and the first reference line crosses the central axis line $L_3$ by an angle $\theta_3$. That is, the first reference line $L_1$ of the first tension adjustment mechanism 93 and the second reference line $L_2$ of the second tension adjustment mechanism 95 tilt on the same side of the central axis line $L_3$. That is, regarding the direction orthogonal to the central axis line $L_3$, a distance from the central axis line $L_3$ to the motor output shaft 49 is $d_3$, and a distance from the central axis line $L_3$ to the motor output shaft 51 is $d_4$. In a case of this disposition mode, for the same reason as the above description, it is also possible to shorten the inter-axis distance H between the first joint shaft 25 and the second joint shaft 27. In this case, by making a difference between the angle $\theta_1$ and the angle $\theta_3$ and making a difference between the distance $d_3$ and the distance $d_4$, it is possible to more reliably avoid contact between the first tension adjustment mechanism 93 and the second tension adjustment mechanism 95.

Further, as shown in the figure, by providing both or one of the locking portions 81a, 83a of the first motor support plate 81 and the second motor support plate 83 on the opposite side to the side where the plates oppose each other, it is possible to avoid contact between the tension adjusting bolts and dispose the both the plates closer to each other. As a result, it is possible to further shorten the inter-axis distance H.

Figure 10A:
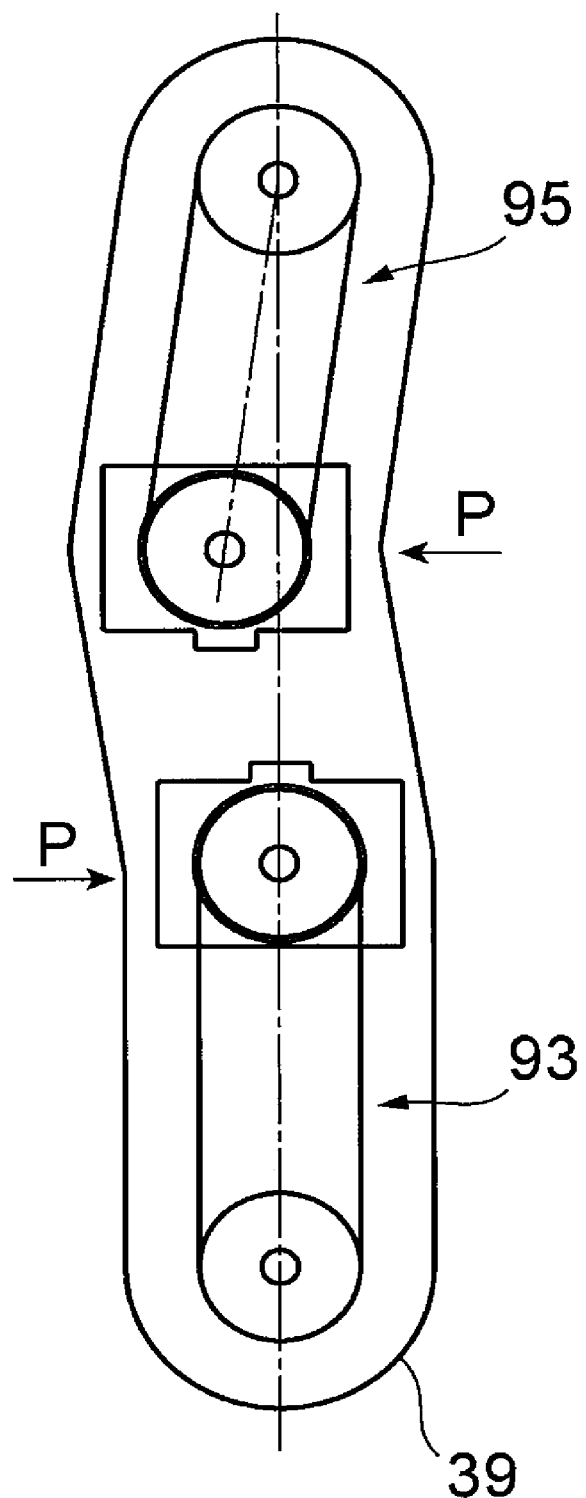
FIG. 10A is an illustrative view showing a shape of the housing in which recessed portions are formed in accordance with disposition of the tension adjustment mechanisms.
Figure 10:
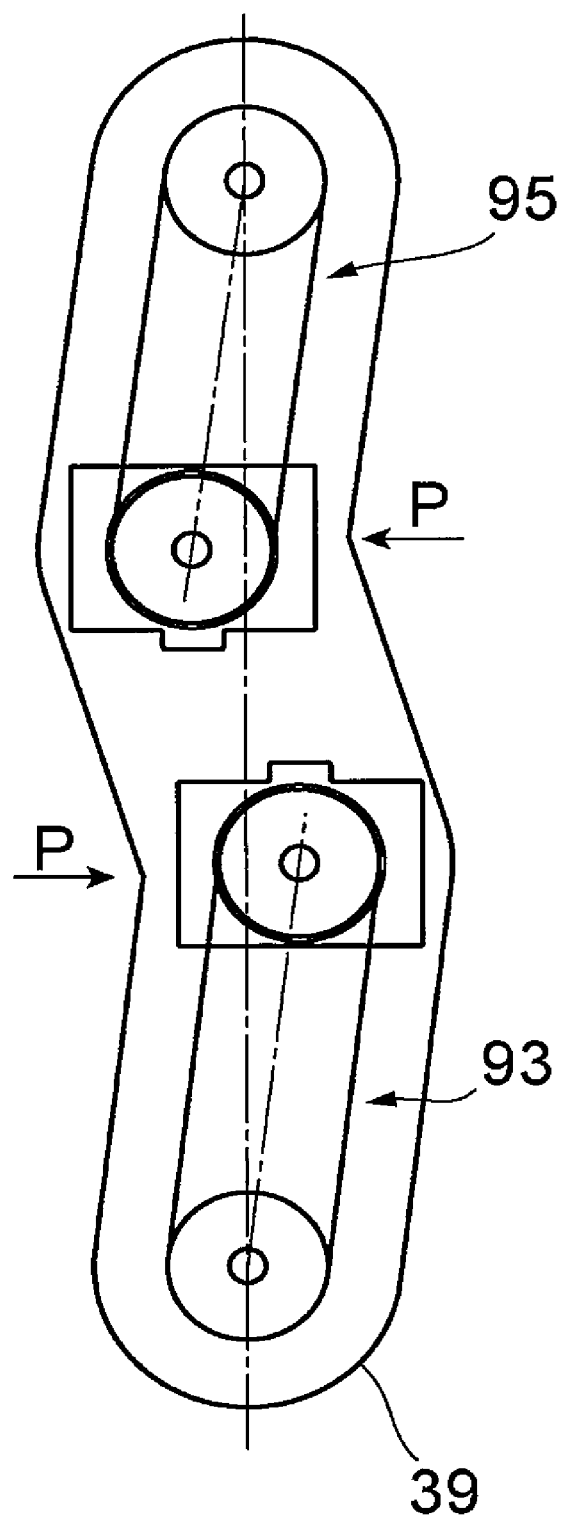
FIG. 10B is an illustrative view showing a shape of the housing in which recessed portions are formed in accordance with disposition of the tension adjustment mechanisms.
FIG. 10C is an illustrative view showing a shape of the housing in which recessed portions are formed in accordance with disposition of the tension adjustment mechanisms.
Figure 10C:
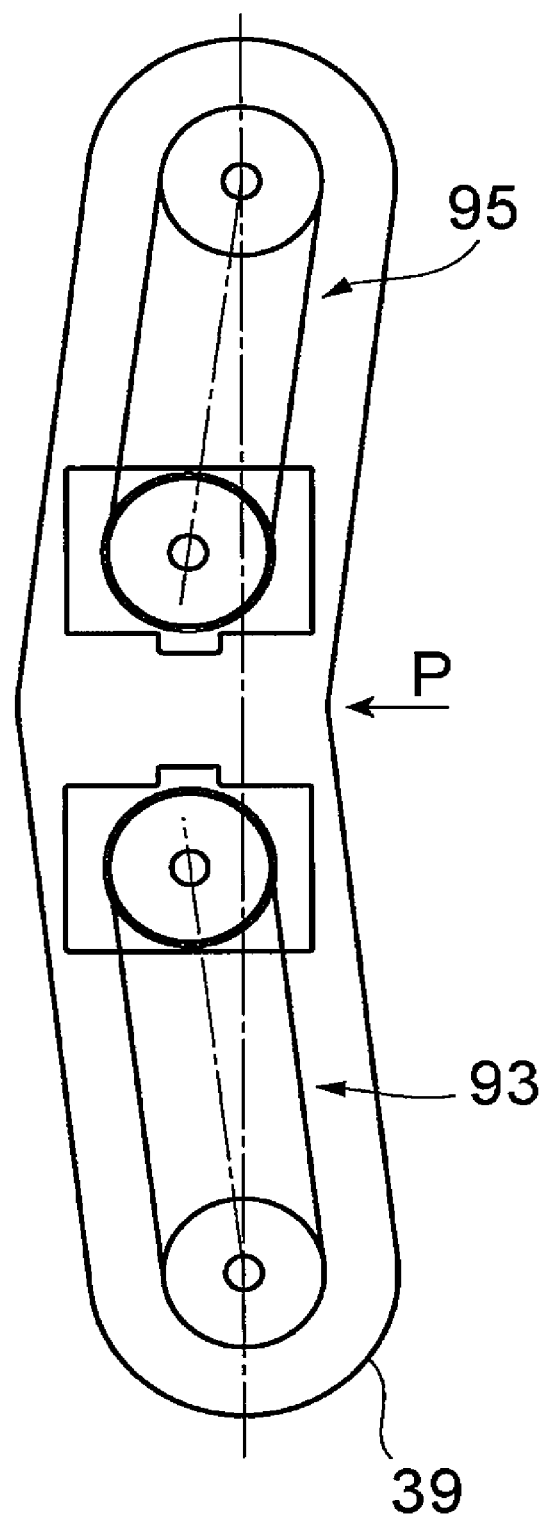

FIGS. 10A, 10B, and 10C are illustrative views showing shapes of the housing in which recessed portions are formed in accordance with disposition of the tension adjustment mechanisms.

In a case where the tension adjustment mechanisms are disposed as shown in FIG. 8, in the housing 39, recessed portions P recessed to the inside of the housing 39 can be formed in part of a side view of the housing shown in FIG. 10A. In a case where the tension adjustment mechanisms are disposed as shown in FIG. 9A or 9B, recessed portions P can be respectively formed as shown in FIG. 10B or 10C.

Figure 11:
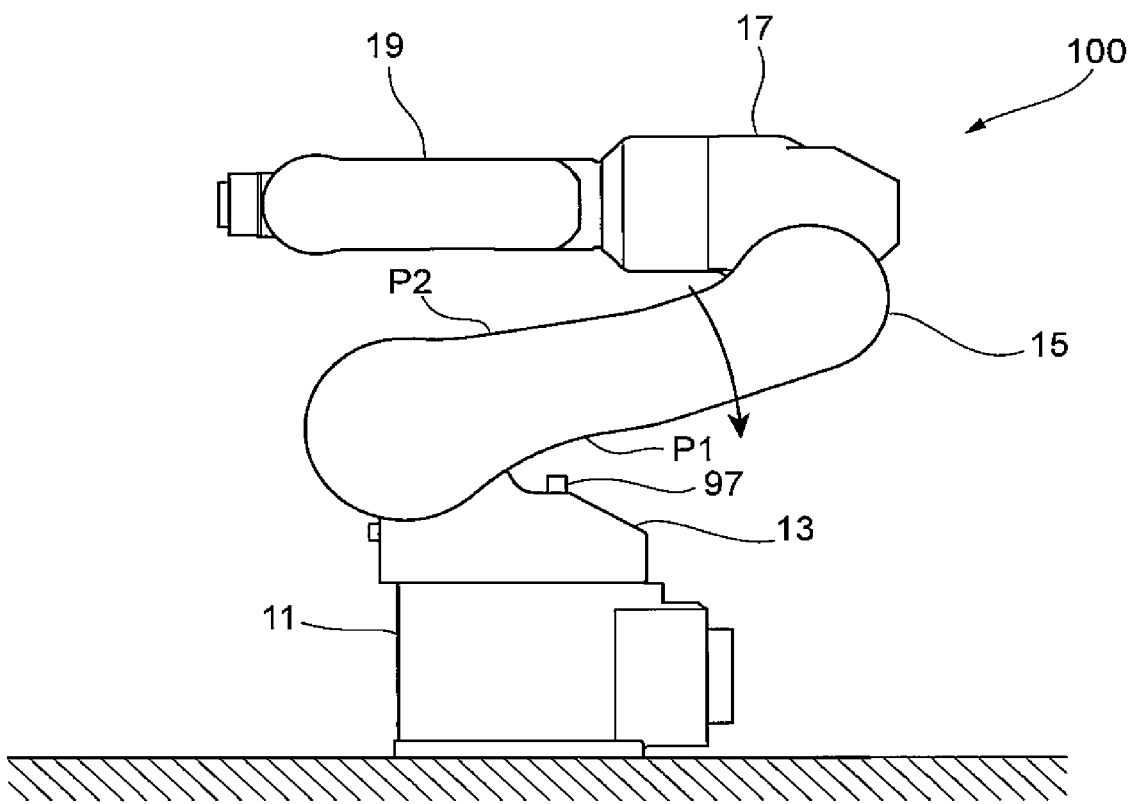
FIG. 11 is a side view of the industrial robot in a posture that the lower arm portion and an upper arm portion are folded.

A case where the industrial robot 100 is in a posture that the lower arm portion 15 and the upper arm portion 17 are folded as shown in FIG. 11 will be considered. In this case, a projection portion 97 disposed on an upper surface of the swinging portion 13, the projection portion projecting upward is brought close to the lower arm portion 15. The upper arm portion 17 and the wrist swinging portion 19 are brought close to the upper side of the lower arm portion 15. In such a posture of the robot, there is a possibility that the lower arm portion 15 is brought into contact with the projection portion 97 or brought into contact with other parts such as the upper arm portion 17 and the wrist swinging portion 19.

In parts where the members to be possibly brought into contact are installed, or in parts opposing the members, the recessed portions P as shown in FIG. 10A, 10B, or 10C are formed. In the case shown in FIG. 11, by forming a recessed portion P1 in a part of the lower arm portion 15 opposing the projection portion 97, a distance between the projection portion 97 and a surface of the lower arm portion 15 opposing this is extended. By forming a recessed portion P2 in a part of the lower arm portion 15 opposing the upper arm portion 17 and the wrist swinging portion 19, a distance between the upper arm portion 17 and the wrist swinging portion 19, and a surface of the lower arm portion 15 opposing these is extended. As a result, in the robot drive axes of the lower arm portion 15, the upper arm portion 17, the wrist swinging portion 19, etc., a substantial movable range where no contact between the members can be increased. Thereby, it is possible to further extend a work region of the robot.

The above disposition of the recessed portions is only an example. Instead of providing the recessed portions in the lower arm portion 15, recessed portions may be provided on the side of the swinging portion 13, the upper arm portion 17, and the wrist swinging portion 19. Recessed portions may also be provided both in the lower arm portion 15 and the other drive axes opposing this. Further, in a rotation region where a drivable range of the robot drive axes of the lower arm portion 15, the upper arm portion 17, etc. is particularly extended, by providing recessed portions in appropriate parts corresponding to positions of the members to be brought into contact, it is possible to extend the drivable range.

The curvature radius of the recessed portions is preferably 50 to 250 mm. When the curvature radius of the recessed portions is 50 mm or more, it is possible to avoid stress concentration of the recessed portions and ensure rigidity of the housing. When the curvature radius is 250 mm or less, it is possible to ensure the recessed portions effective for extending the drivable range of the robot drive axes.

With the industrial robot 100 of the present configuration described above, it is possible to dispose the members for power transmission and the members for cable wiring separately in spaces different from each other in the lower arm portion 15. Thus, it is possible to improve the assembling property and the maintenance property.

As shown in FIG. 8, at least one of the first reference line $L_1$ of the first tension adjustment mechanism 93 and the second reference line $L_2$ of the second tension adjustment mechanism 95 crosses the central axis line $L_3$. Thus, the motor output shafts 49, 51 are disposed to be displaced from each other by the distance $d_1$ in the direction orthogonal to the central axis line $L_3$. Thereby, it is possible to dispose the tension adjusting bolts 87, 89 with no contact with each other, and easily ensure a work space in which a tool for adjusting the tension adjusting bolts 87, 89 is inserted. In comparison to a case where the first reference line $L_1$ and the second reference line $L_2$ are disposed on the same axis as the central axis line $L_3$, it is possible to dispose the tension adjusting bolts 87, 89 so that the axis directions of the tension adjusting bolts are offset from each other, and shorten the inter-axis distance H between the first joint shaft 25 and the second joint shaft 27. As a result, it is possible to shorten longitudinal size of the lower arm portion 15, and downsize the industrial robot 100.

By the lower arm portion 15 having the housing of the H-shaped structure, it is possible to obtain high rigidity with a compact configuration. It is also possible to ensure a wide installment space in which the first drive motor and the second drive motor can be stably built.

Further, by providing the recessed portions in the lower arm portion 15, in a case where the lower arm portion 15 and the upper arm portion 17 of the industrial robot 100 are folded as shown in FIG. 11, it is possible to avoid contact with peripheral members. By providing the recessed portions, it is possible to extend the movable range of the lower arm portion 15 and the upper arm portion 17, and extend a work range of the industrial robot. Further, it is possible to suppress the maximum height of the industrial robot at the time of folding the lower arm portion 15 and the upper arm portion 17 to be low.

In such a way, the present invention is not limited to the above embodiment. However, combinations of the configurations of the embodiment and changes and applications by those skilled in the art based on the description and the known techniques are also expected by the present invention and included in the range to seek protections.

For example, the industrial robot of the present embodiment may be a welding robot in which a welding torch is attached to the distal end axis side part of a multi-axis robot, or in addition, a robot to be used for various assembling processes, testing processes, etc.

The present application is based on the Japanese Patent application (Japanese Patent Application No. 2016-237749) filed in Dec. 7, 2016, and contents thereof are taken herein as a reference.

EXPLANATION OF REFERENCE NUMERALS

13: Swinging portion
15: Lower arm portion
15a: Proximal end side part
15b: Distal end side part
17: Upper arm portion
25: First joint shaft
27: Second joint shaft
29: First drive motor
31: Second drive motor
35A, 35B: Proximal end side support portion
37A, 37B: Distal end side support portion
39: Housing
45: Housing main body
49: Motor output shaft
51: Motor output shaft
53: First drive pulley
55: High speed shaft
57: First driven pulley
59: First belt member
60: First power transmission mechanism
61: Second drive pulley
63: High speed shaft
65: Second driven pulley
67: Second belt member
68: Second power transmission mechanism
69: Cable bundle
93: First tension adjustment mechanism (first sliding mechanism)
95: Second tension adjustment mechanism (second sliding mechanism
100: Industrial robot

The invention claimed is:

1. An industrial robot, comprising:
a swinging portion;
a lower arm portion whose proximal end side part is rotatably coupled to the swinging portion via a first joint shaft; and
an upper arm portion rotatably coupled to a distal end side part of the lower arm portion via a second joint shaft which is parallel to the first joint shaft, wherein
the lower arm portion has:
  a pair of proximal end side support portions disposed to be separated from each other, the proximal end side support portions forming the first joint shaft;
  a pair of distal end side support portions disposed to be separated from each other, the distal end side support portions forming the second joint shaft; and
  a housing that respectively integrally supports the proximal end side support portions and the distal end side support portions, the housing accommodates:
  a first drive motor and a second drive motor disposed between the proximal end side support portions and the distal end side support portions;
  a first power transmission mechanism that transmits rotation of the first drive motor to the first joint shaft;
  a second power transmission mechanism that transmits rotation of the second drive motor to the second joint shaft; and
  a cable bundle including at least cables connected to the first drive motor and the second drive motor, and
the first power transmission mechanism and the second power transmission mechanism are disposed on a first shaft end side of the first joint shaft and the second joint shaft, and the cable bundle is disposed on a second shaft end side that is opposite to the first shaft end side,
wherein the first power transmission mechanism has:
  a first drive pulley connected to an output shaft of the first drive motor;
  a first driven pulley connected to the proximal end side support portion on the first shaft end side; and
  a first belt member looped over the first drive pulley and the first driven pulley, wherein the second power transmission mechanism has:
  a second drive pulley provided in an output shaft of the second drive motor;
  a second driven pulley provided in the distal end side support portion on the first shaft end side: and a second belt member looped over the second drive pulley and the second driven pulley, wherein the first power transmission mechanism and the second power transmission mechanism are disposed on the same plane, wherein the industrial robot further comprises, in a side view seen from the axial direction of the first joint shaft and the second joint shaft of the housing, in a case where a line connecting the axis of the first joint shaft and the axis of the output shaft of the first drive motor serves as a first reference line, a line connecting the axis of the second joint shaft and the axis of the output shaft of the second chive motor serves as a second reference line, and a line connecting the axis of the first joint shaft and the axis of the second joint shaft serves as the central axis line:

a first sliding mechanism that moves the first drive motor along the first reference line; and a second sliding mechanism that moves the second drive motor along the second reference line, and wherein the first sliding mechanism and the second sliding mechanism are disposed in such a manner that at least one of the first reference line and the second reference line crosses the central axis line.

2. The industrial robot according to claim 1, wherein at least part of the housing in the side view has a recessed portion recessed toward the central axis line.

3. The industrial robot according to claim 2, wherein the curvature radius of the recessed portion is 50 to 250 mm.

4. The industrial robot according to claim 1, wherein a separation distance between the first joint shaft and the second joint shaft is 300 to 400 mm.

5. The industrial robot according to claim 1, wherein the cables include at least driving cables of the first drive motor and the second drive motor.

6. The industrial robot according to claim 4, wherein the cables include at least driving cables of the first drive motor and the second drive motor.

7. The industrial robot according to claim 1, wherein the industrial robot is a multi-axis robot having at least six-axis freedom.

8. The industrial robot according to claim 1, wherein the first sliding mechanism and the second sliding mechanism are disposed in such a manner that the first reference line and the second reference line cross the central axis line.

9. The industrial robot according to claim 1, wherein the first sliding mechanism and the second sliding mechanism are disposed in such a manner that the first reference line crosses the central axis line in an opposite direction to the second reference line.

* * * * *